United States Patent
Yoshikawa et al.

(10) Patent No.: US 7,490,649 B2
(45) Date of Patent: Feb. 17, 2009

(54) HEAVY DUTY TIRE WITH BEAD ANCHOR RUBBER

(75) Inventors: Hideaki Yoshikawa, Kobe (JP); Kiyohito Maruoka, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 280 days.

(21) Appl. No.: 11/326,442

(22) Filed: Jan. 6, 2006

(65) Prior Publication Data

US 2006/0196591 A1 Sep. 7, 2006

(30) Foreign Application Priority Data

Mar. 1, 2005 (JP) ............................. 2005-056270

(51) Int. Cl.
 B60C 9/02 (2006.01)
 B60C 15/00 (2006.01)
 B60C 15/04 (2006.01)
 B60C 15/06 (2006.01)

(52) U.S. Cl. ....................... 152/540; 152/547; 152/552; 152/564

(58) Field of Classification Search ................. 152/540, 152/547, 552, 564
See application file for complete search history.

(56) References Cited

U.S. PATENT DOCUMENTS

| 6,736,177 B2 | 5/2004 | Ueyoko | |
|---|---|---|---|
| 2005/0045260 A1* | 3/2005 | Maruoka et al. | 152/547 X |
| 2005/0081976 A1* | 4/2005 | Maruoka et al. | 152/552 X |
| 2005/0109441 A1* | 5/2005 | Sugiyama et al. | 152/540 |
| 2005/0126675 A1* | 6/2005 | Maruoka et al. | 152/552 X |
| 2005/0150583 A1* | 7/2005 | Maruoka et al. | 152/552 |

FOREIGN PATENT DOCUMENTS

JP 2002059716 A 2/2002

\* cited by examiner

*Primary Examiner*—Adrienne C Johnstone
(74) *Attorney, Agent, or Firm*—Birch, Stewart, Kolasch & Birch, LLP

(57) ABSTRACT

A heavy duty tire comprises a bead core disposed in each bead portion, and a carcass ply of steel cords extending between the bead portions. The edges of the carcass ply are winded around the bead cores from the axially inside to outside of the tire to form a pair of winded portions and a main portion therebetween. The winded portion around the bead core comprises an axially inwardly extending turnback part above the bead core, and a base part under the bead core. The base part is curved concavely so as to form a space between the base part and the bead core, and an anchor rubber having a complex elastic modulus of from 20 to 80 MPa is disposed in the space to tightly pinch the carcass cords between the anchor rubber and the bead seat of the wheel rim.

7 Claims, 6 Drawing Sheets

HEAVY DUTY TIRE WITH BEAD ANCHOR RUBBER

BACKGROUND OF THE INVENTION

1. Field of the Invention

The present invention relates to a pneumatic tire, more particularly to a bead structure suitable for heavy duty tires capable of improving bead durability.

2. Description of the Related Art

In general, heavy duty tires such as truck/bus tires are inflated to a very high pressure of 600 to 800 kPa.

Such heavy duty tires are disclosed in Japanese patent No. 3441720 and U.S. Pat. No. 6,736,177 cognate thereto, wherein a steel cord carcass ply (b) is secured to bead cores (c) in the bead portions by winding the ply edges (b2) around the bead cores as shown in FIG. 6.

In the bead portions of such a tire, due to the high inflation pressure and the application of a heavy tire load, the carcass ply main portion (b1) is pulled radially outwards, a force to rotate the bead core (c) occurs. As a result, the carcass cords are moved, and following the carcass ply the bead wire making up the core (c) is moved and the bead core is deformed. Further, the bead toe (Bt) is lifted from the bead seat (Js) of the rim (J). Such a deformed state is very liable to remain after freed from the pulling force. Thus, if the tire is once removed from the rim, it is difficult to remount the tire on the rim because a high percentage of the air injected into the tire to inflate the tire and to place the bead portions in place leaks through between the bead bottom and bead seat. Further, if well remounted, there is a possibility of bead unseating under very severe service conditions and deterioration of durability.

BRIEF SUMMARY OF THE INVENTION

It is therefore, an object of the present invention to provide a heavy duty tire in which the carcass cords' movement is minimized and thereby the deformation of the bead portion such as bead toe lift and also deformation and rotation of the bead core are effectively prevented to improve the bead durability.

According to the present invention, a heavy duty tire comprise a tread portion, a pair of sidewall portions, a pair of bead portions each with a bead core therein, a carcass ply of steel cords extending between the bead portions, the carcass ply having edges winded around the bead cores from the axially inside to outside of the tire to form a pair of winded portions and a main portion therebetween, wherein the winded portion around each bead core comprises an axially inwardly extending turnback part above the bead core, and a base part under the bead core, the base part is curved concavely so as to form a space between the base part and the bead core, and an anchor rubber having a complex elastic modulus of from 20 to 80 MPa is disposed in the space.

Here, the complex elastic modulus was measured with a viscoelastic spectrometer "VES F-3 type" made by IWA-MOTO SEISAKUSYO using a specimen (30 mm long-.times.4 mm width.times.1 to 2 mm thickness). The specimen was took out from the disassembled tire and the cut surface was smoothed by buffing. The measuring conditions are as follows: temperature 70 degrees C., frequency 10 Hz, initial elongation 10% and one-half amplitude 1%.

Therefore, when the tire is mounted on a wheel rim, the anchor rubber together with the bead seat of the wheel rim pinches the base part of the carcass ply's winded portion, and if pulled the movement of the carcass ply is effectively restricted to prevent the deformation and rotation of the bead core and the deformation of the bead portion such as bead toe lifting. Thus, the bead durability can be improved as well as the difficulty in remounting the tire can be eliminated.

BRIEF DESCRIPTION OF THE DRAWINGS

Embodiments of the present invention will now be described in detail in conjunction with the accompanying drawings.

DETAILED DESCRIPTION OF THE INVENTION

Figure 1:
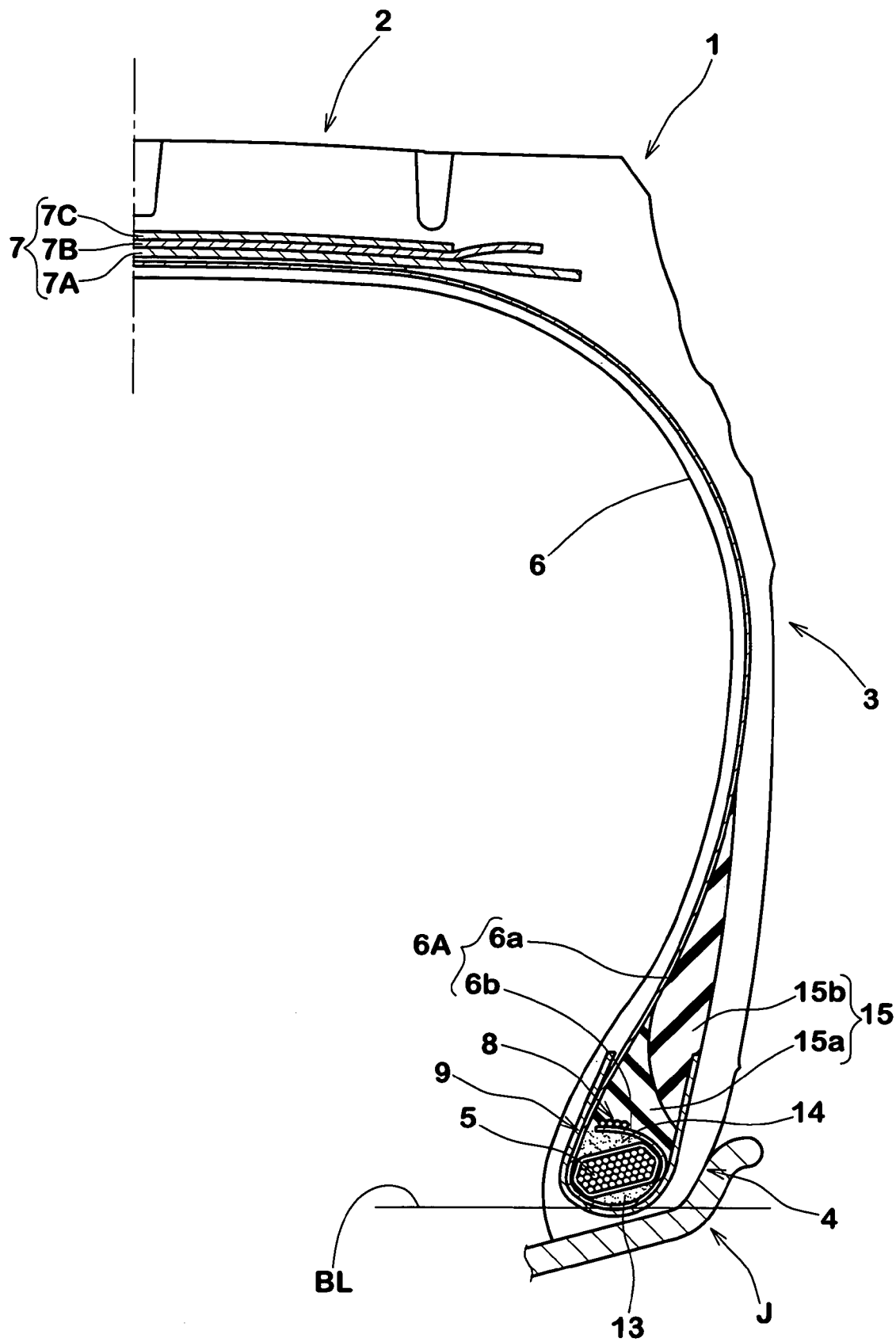
FIG. 1 is a cross sectional view of a heavy duty tire according to the present invention.
Figure 2:
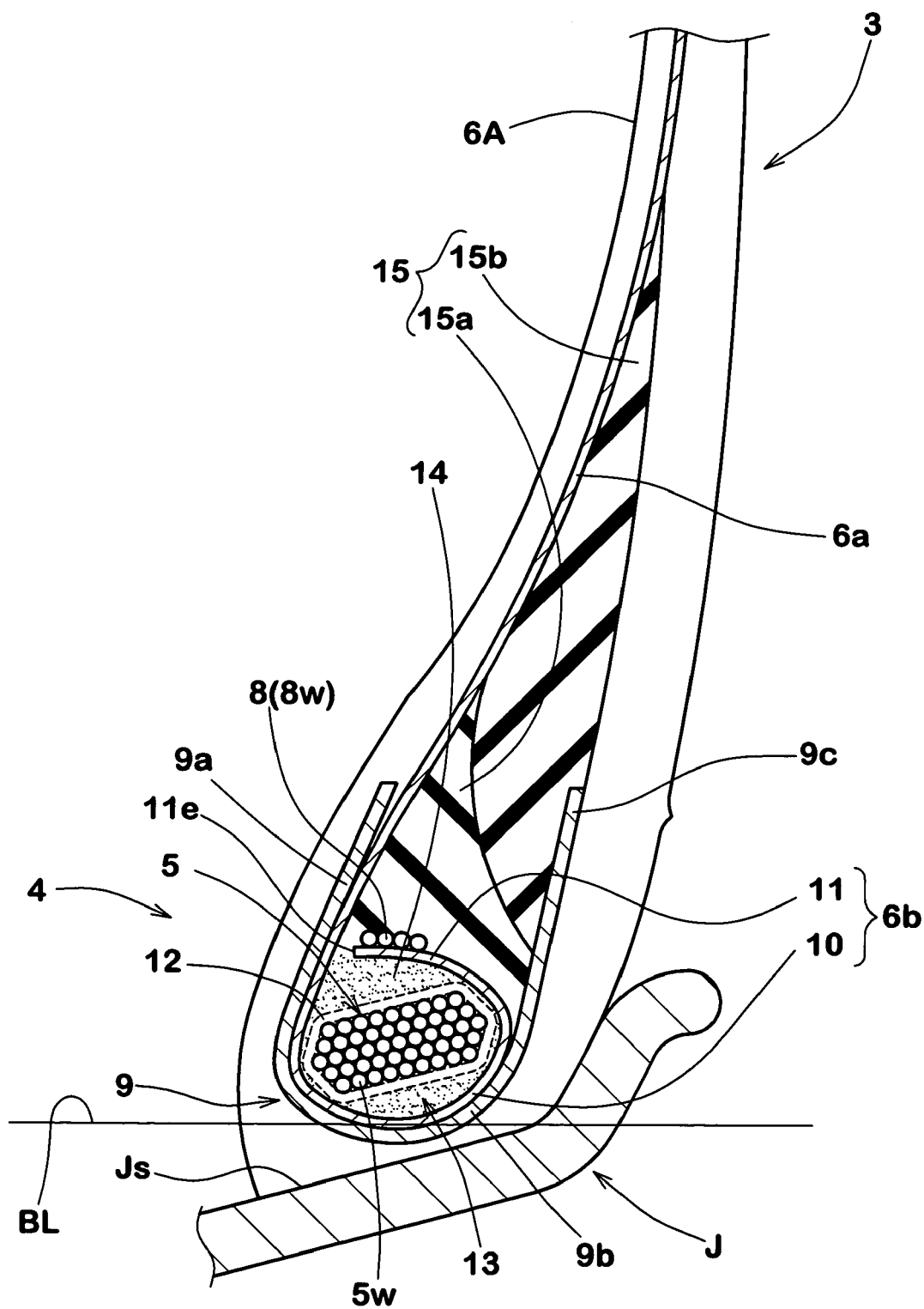
FIG. 2 is a cross sectional view of the bead portion and a lower sidewall portion thereof.

In the drawings, heavy duty tire 1 according to the present invention comprises a tread portion 2, a pair of axially spaced bead portions 4 each with a bead core 5 therein, a pair of sidewall portions 3 extending between the tread edges and the bead portions, a carcass 6 extending between the bead portions, and a belt 7 disposed radially outside the carcass 6 in the tread portion 2.

FIG. 1 shows the normally inflated unloaded state of the tire. Here, the normally inflated unloaded state is such that the tire is mounted on a standard wheel rim J and inflate to a standard pressure but loaded with no tire load. The standard wheel rim J is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various cold Inflation Pressures" table in TRA or the like. The standard load is the "maximum load capacity" in JATMA, the "Load Capacity" in ETRTO, the maximum value given in the above-mentioned table in TRA or the like.

The wheel rim J comprises a pair of bead seats Js for the bead portions 4, a flange extending radially outwardly from the axially outer end of each bead seat Js, and a rim well for tire mounting (not shown) formed between the bead seats.

In the following embodiments, the heavy duty tire 1 is a tubeless radial tire to be mounted on a 15-degree-taper center-drop rim. The bead seat Js is tapered axially inwards at 15 degrees, and accordingly, the bottom of the bead portion 4 is also inclined at almost 15 degrees, more accurately 15 degrees or slightly larger.

In the tread portion 2, the belt 7 is disposed on the radially outside of the crown portion of the carcass 6.

The belt 7 is composed of at least two cross plies 7B and 7C, in this embodiment three plies 7A, 7B and 7C, each made of steel cords laid parallel with each other. The cords of the radially innermost first ply 7A are laid at an angle of 45 to 75 degrees with respect to the tire equator C. The cords of the radially outer second and third plies, namely, cross plies 7B and 7C are laid at a relatively small angle of 10 to 35 degrees with respect to the tire equator C.

The carcass 6 is composed of at least one ply 6A of cords arranged radially at an angle in the range of from 80 to 90 degrees with respect to the tire equator CO, extending between the bead portions 4 through the tread portion 2 and sidewall portions 3 and winded around the bead core 5 in each bead portion 4 from the axially inside to the axially outside of the tire to form a pair of winded portions 6b and a main portion 6a therebetween. As the carcass cords, steel cords and organic fiber cords, e.g. polyester, aromatic polyamide, rayon, nylon and the like can be used. The carcass cords are rubberized with a topping rubber tg to improve adhesion between the carcass cords and adjacent rubber. In this embodiment, the carcass 6 is composed of a single ply 6A of steel cords 6C arranged radially at an angle of 90 degrees with respect to the tire equator CO. In the case of the steel carcass cords 6C, preferably used as the topping rubber tg therefor is a relatively soft rubber material having a complex elastic modulus of less than 20 MPa, more preferably less than 11 MPa but not less than 7 MPa and being superior in adhesion to natural rubber or similar.

In the tread portion, a tread rubber is disposed on the radially outside of the belt, defining the tread surface. In the sidewall portion, a sidewall rubber is disposed on the axially outside of the carcass, defining the sidewall surface. In the bead portion, a bead rubber is disposed along the bead bottom 4b between the bead toe and bead heel and extends axially outwards from the bead toe and bead heel. On the axially outer surface of the tire, the bead rubber extends beyond the contact point with the rim flange and spliced with the sidewall rubber on the axially outside of the undermentioned bead filler 15.

In each of the bead portions 4, the bead core 5 is disposed to increase the engagement between the bead core and wheel rim J.

The bead core 5 is formed by orderly winding a steel wire 5w having a circular cross sectional shape. Thus, the bead core is made up of windings of a single steel wire 5w.

Figure 3:
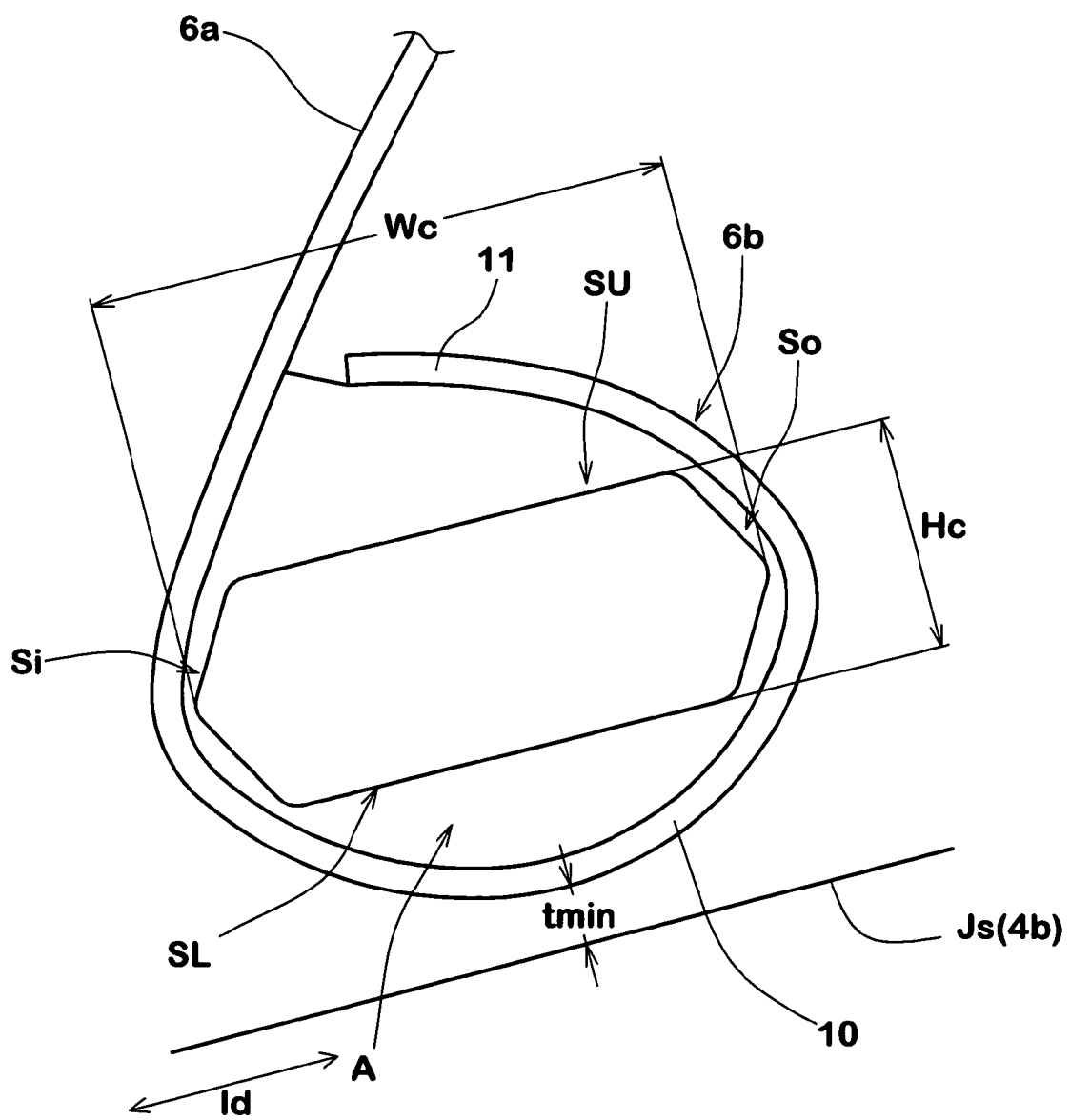
FIG. 3 is a diagram showing the arrangement of the bead core.

In the tire meridian section, namely, the cross section including the rotational axis of the tire, the contour line or cross sectional shape of the bead core is elongated in a direction (Id) inclining in parallel to the bead seat Js which direction is the substantially same as the inclination of the bead bottom 4b as shown in FIG. 3.

In this example, the number of windings of the steel wire 5w in each layer is 9, 10, 11, 10 and 9 from the radially inside to the outside. The bead core 5 has a hexagonal cross sectional shape which has a radially inner side and a radially outer side which are substantially parallel to the above-mentioned inclining direction (Id) and define the radial inner face SL and radial outer face SU of the bead core 5, respectively. Further, the hexagonal cross sectional shape has two sides on the axially inside which define the axially inner face Si of the bead core 5, and two sides on the axially outside which define the axially outer face So of the bead core 5. AS the bead seats Js are inclined at 15 degrees with respect to the tire axial direction, the radially inner face SL and outer face SU of the bead core 5 are inclined at approximately 15 degrees with respect to the tire axial direction.

To provide a uniform binding force across the bead bottom width and to prevent the lifting of the bead toe and the like, the aspect ratio (Hc/Wc) between the maximum width Wc measured in the above-mentioned inclining direction (Id) and the maximum height HC measured perpendicularly thereto is preferably set in a range of not less than 0.43, more preferably more than 0.45, but not more than 0.58, more preferably less than 0.56. This is however, not necessarily mean that the cross sectional shape is limited to such a hexagonal shape. For example, a rectangle, oval or the like being long in the direction (Id) as well as a regular hexagon, circular form etc. may be used too.

Further, the bead core 5 in this example is wrapped with a wrapping material 12. The wrapping material 12 retains the cross sectional shape of the bead core and also prevents a direct contact between the steel bead wire and the steel carcass cords 6C to prevent their fretting wear. For those purpose, for example, a strip or tape of rubberized woven or nonwoven organic fiber fabric is preferably used, and it is wound around the bead core.

The above-mentioned carcass ply 6A is made up of a toroidal main portion 6a extending between the bead cores 5 and a pair of winded portions 6b winded around the bead cores 5 from the axially inside to the axially outside of the tire.

The winded portion 6b has a base part 10 curved in an arc along the above-mentioned faces Si, SL and So of the bead core 5, and a turnback part 11 extending axially inwards from the axially outer end of the base part 10.

In this embodiment, therefore, between the base part 10 and the radially inner face SL, a space (A) having a crescent sectional shape and a certain volume continuing in the tire circumferential direction is formed.

The turnback part 11 terminates before the carcass ply main portion 6a not to contact therewith, and the gap U2 between the end 11e thereof and the carcass ply main portion 6a is preferably set in a range of from 1 to 5 mm (cord to cord distance). If the distance U2 is less than 1 mm, it is difficult for the rubber between the main portion 6a and the end 11e of the turnback part 11 to absorb the movement of the end 11e and mitigate the stress at the end 11e. If the distance U2 is more than 5 mm, the force to secure the turnback part 11 to the bead core 5 becomes insufficient.

In order to place the end 11e of the turnback part 11 within a region where deformations during running become minimum, the distance U1 of the end 11e from the bead core 5 (not from the wrapping material 12) is set in a range of not less than 3.0 mm more preferably more than 4.0 mm, but not more than 8.0 mm more preferably less than 7.0 mm. The distance U1 is the minimum distance which in this embodiment occurs when measured perpendicularly to the radially outer surface SU of the bead core. If the distance U1 is less than 3.0 mm, the springback of the turnback part 11 becomes strong, and it is difficult to prevent the formation of small cavity between the turnback part 11 and adjacent rubber. If the distance U1 is more than 8.0 mm, the securing of the winded portion 6b to the bead core 5 tends to become insufficient.

The space of a generally triangular cross sectional shape surrounded by the carcass ply main portion 6a, turnback part 11 and the bead core 5, is filled with a bead apex 14. In order to mitigate stress and shock at the end 11e of the turnback part 11, the bead apex 14 is made of a low-resilience rubber having a complex elastic modulus ER*a of not less than 5 MPa, preferably more than 6 MPa, more preferably more than 7 MPa, but not more than 15 MPa, preferably less than 13 MPa, more preferably less than 11 MPa. If the complex elastic modulus E*a is less than 5 MPa, as the movement of the turnback end 11e during running rather increases, it is difficult to achieve its objective. If the complex elastic modulus E*a is more than 15 MPa, as the bead apex 14 becomes hard, when the main portion 6a is deformed to lean axially outwards during running, the bead apex 14 tends to rotate the bead core 5 contrary to the object of the present invention.

In this embodiment, in order to prevent the springback of the turnback part 11, an auxiliary cord layer 8 is disposed on the radially outside of the turnback part 11.

The auxiliary cord layer 8 is formed by winding a single cord 8w at least one turn preferably 2 to 8 turns spirally around the turnback part 11. The auxiliary cord layer 8 is rubberized with a topping rubber tg in a form of a single cord or an aggregation of windings. The strength of the cord 8w is preferably in a range of from 2000 to 4000 N, more preferably from 2500 to 3500 N. A steel cord (inclusive of a single wire) or an organic cord (inclusive of a monofilament) can be used as the cord 8w. In this embodiment, a steel wire covered with the topping rubber tg is used as the cord 8w.

On the radially outside of the turnback part 11, a bead filler 15 is further disposed.

The bead filler 15 extends along the axially outside of the carcass ply main portion 6a, while tapering towards its radially outer end. In this embodiment, the bead filler 15 includes a radially inner stiffener 15a having a complex elastic modulus E*b of from 20 to 70 MPa, and a radially outer buffer 15b having a complex elastic modulus E*c less than the complex elastic modulus E*b. Preferably, the buffer 15b has a complex elastic modulus E*c in a range of not less than 3 MPa, preferably more than 3.5 MPa, but not more than 7 MPa, preferably less than 5 MPa. The above-mentioned complex elastic modulus E*b of the stiffener 15a is preferably set in a range of not less than 25 MPa, more preferably more than 30 MPa, but not more than 65 MPa, more preferably less than 60 MPa.

The bead filler 15 (stiffener 15a) contacts with the bead apex 14 through the above-mentioned gap U2, and they are merged. Thus, the turnback part 11 is secured between the stiffener 15a and bead apex 14.

The stiffener 15a extends radially outwardly along the carcass main portion 6a, and the radially outermost end resides on the axially outer surface of the main portion 6a. From this radially outermost end, the axially outer surface of the stiffener 15a extends radially inwardly in a concave curve to a position on the axially outer surface of the bead filler 15 which position locates at a radial height almost same as the end 11e of the turnback part 11. From this position the axially outer surface of the buffer 15b extends radially outwardly to the radially outer end, and between this radially outer end and the radially inner end, the axially inner surface of the buffer 15b extends, abutting on the axially outer surfaces of the main portion 6a and stiffener 15a. Therefore, the buffer 15b has a streamlined cross-sectional shape. As a result, the stiffener 15a can bypass a force to lean the main portion 6a axially outwards and thereby the bead core 5 can be prevented from being rotated.

In this embodiment, the bead portion 4 is further provided with a steel cord layer 9 made of steel cords inclined at an angle of from 10 to 40 degrees with respect to the tire circumferential direction.

The steel cord layer 9 extends in a U-shape along the carcass ply 6A from the axially inside of the carcass ply main portion 6a to the axially outside of the winded portion 6b. So the steel cord layer 9 has a base portion 9b along the base part 10, an axially inner portion 9a and axially outer portion 9c. The inner portion 9a extends radially outwardly along the carcass ply main portion 6a, and the outer portion 9c extends radially outwardly along the axially outside of the bead filler 15, separating from the carcass ply. These portions 9a and 9c extends into a lower sidewall portion beyond the radially outer end of the flange of the rim J. Therefore, the steel cord layer 9 can disperse the heat transferred from the braking device of the vehicle through the wheel rim and also the heat generated in the bead portion itself. Thus the steel cord layer 9 functions as a thermal isolator or protector. Further, as the stiffener 15a extends between the axially inner and outer portions 9a and 9c so as to close the opening of the U-shape, the winded portion 6b is packed around the bead core and the pullout resistance can be further improved.

If the complex elastic modulus E*b of the stiffener 15a is less than 20 MPa, the force to secure the turnback part 11 tends to become insufficient. If the complex elastic modulus E*b is more than 60 MPa, a stress concentration at the radially outer edge e2 of the outer portion 9c of the steel cord layer 9 increases and a separation failure tends to occur.

If the complex elastic modulus E*c of the buffer is less than 3 MPa, a separation failure at the interface between the stiffener 15a tends to occur. If the complex elastic modulus E*c is more than 7 MPa, bending stress concentrates at the radially outer edge of the buffer 15b and damage is liable to occur, starting from such a point.

Figure 4:
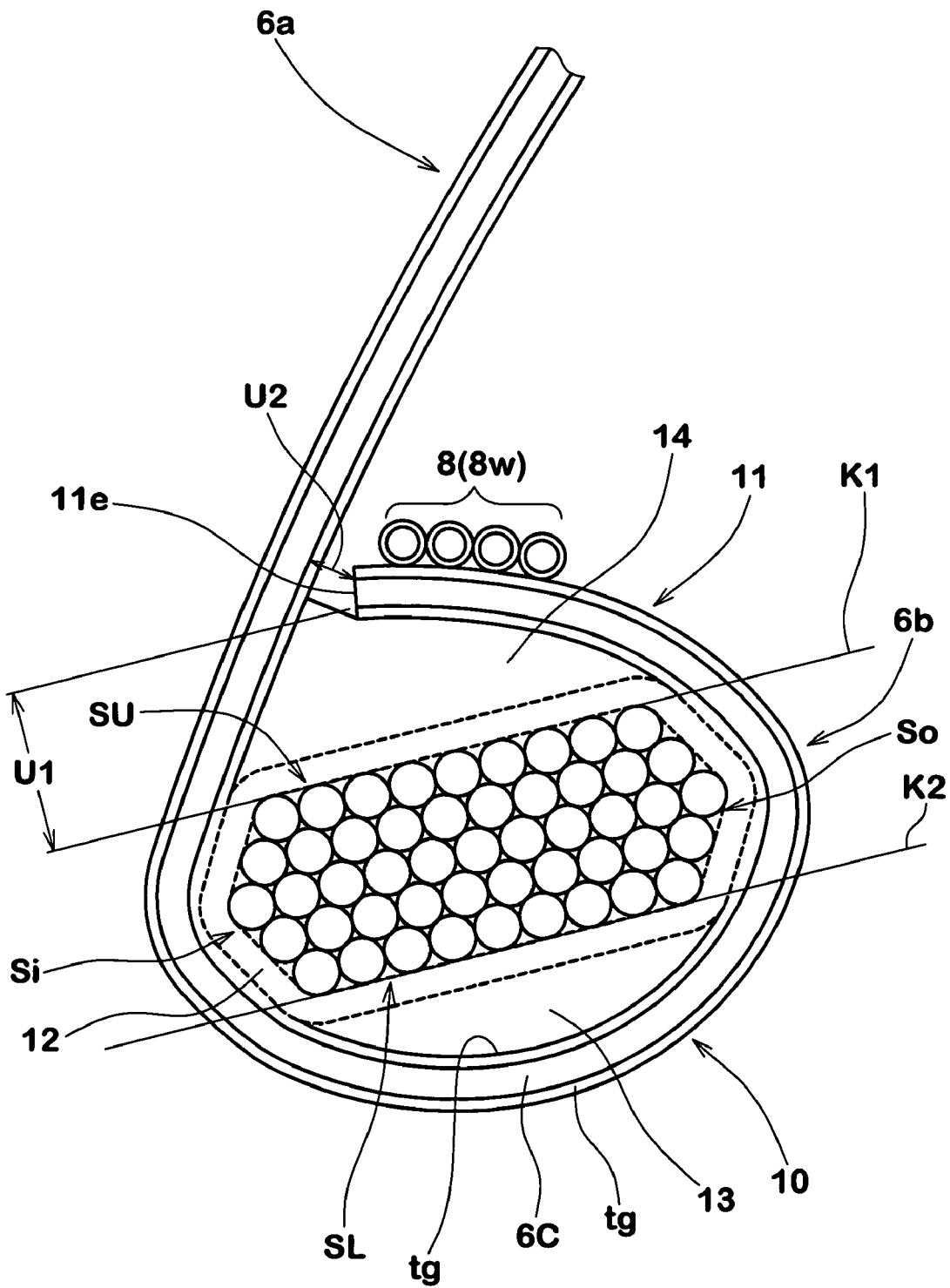
FIG. 4 and FIG. 5 are enlarged schematic cross sectional views each showing an example of the anchor rubber under the bead core.
Figure 5:
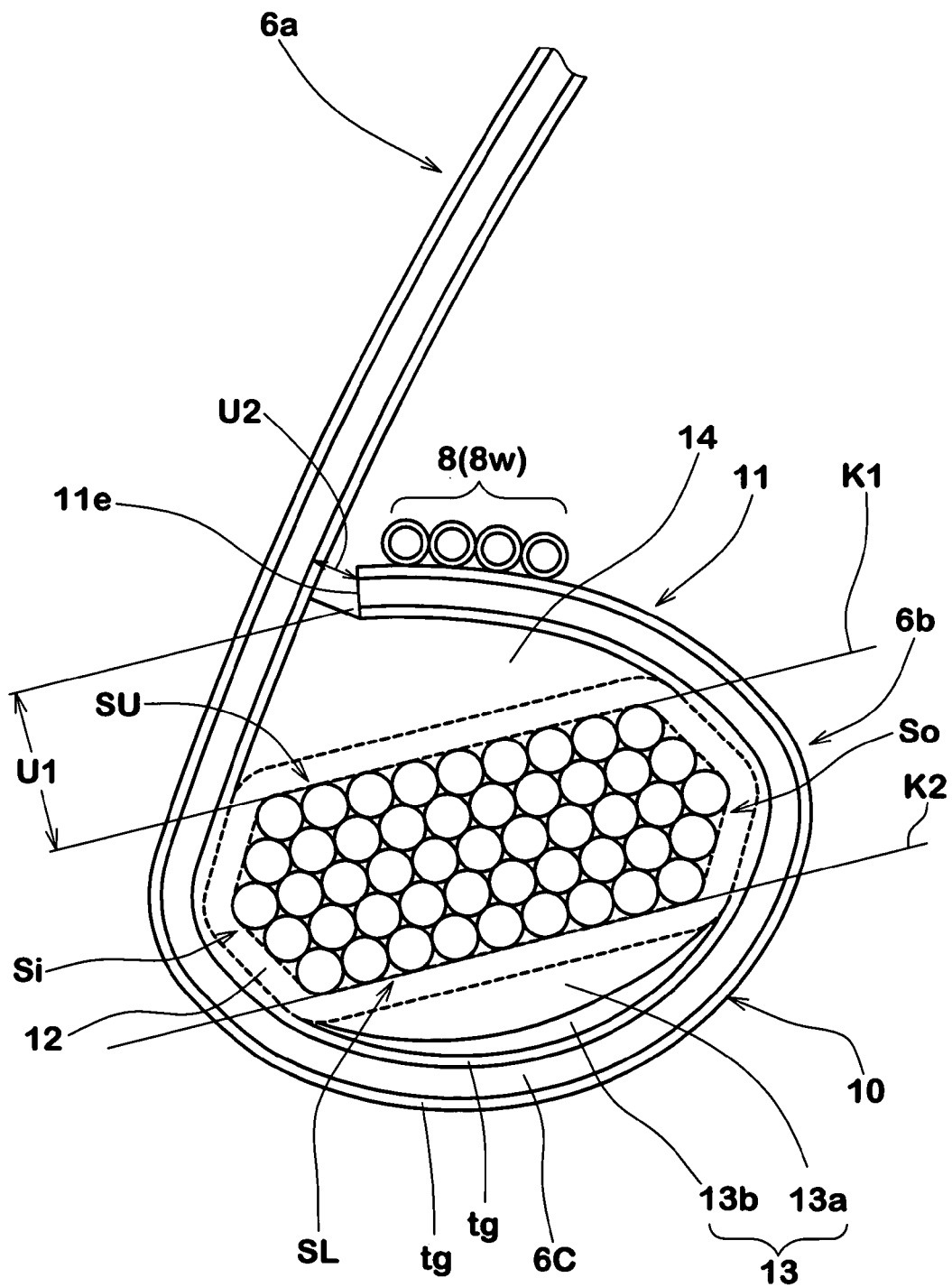
Figure 6:
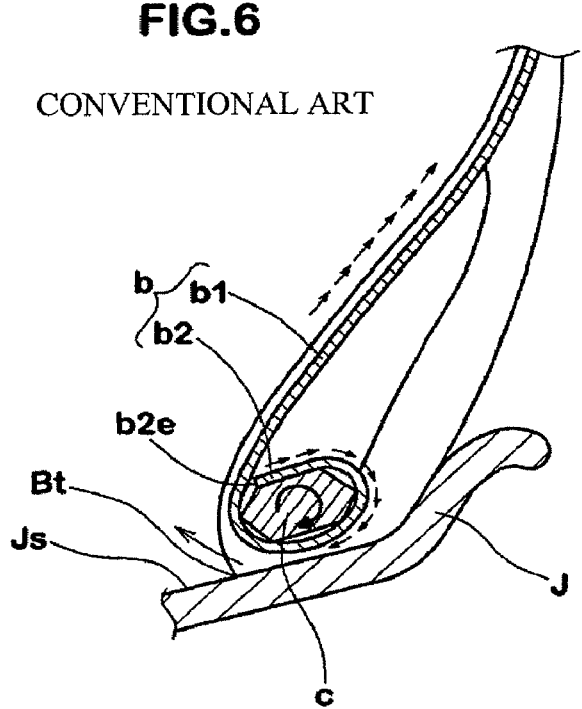
FIG. 6 is a diagram for explaining the problems to be solved by the present invention.

As shown in FIG. 4 and FIG. 5, the bead portions 4 are each provided under the bead core 5 with an anchor rubber 13.

When the tire is mounted on the rim J, the anchor rubber 13 is relatively pressed by the bead core toward the bead bottom 4b and presses the carcass cords towards the bead bottom 4b which is firmly supported by the bead seat Js of the wheel rim J, and thereby the carcass cords 6C are tightly pinched between the anchor rubber 13 and the bead seat Js.

For that purpose, the anchor rubber 13 has to have a complex elastic modulus of not less than 20 MPa, preferably more than 25 MPa, more preferably more than 28 MPa, still more preferably more than 30 MPa, but not more than 80 MPa, preferably less than 70 MPa, more preferably less than 65 MPa, still more preferably less than 60 MPa. If the complex elastic modulus is less than 20 MPa, the rubber becomes too soft and it is difficult to secure the cords. If more than 80 MPa, the formability of the rubber decreases.

Further, the minimum distance tmin from the bead bottom 4b to the adjacent carcass cords 6C is set in a range of less than 2.0 mm preferably less than 1.5 mm but more than 0.3 mm. In this minimum distance position, the carcass cord topping rubber thickness is very small for example about 0.1 to 0.5 mm, and the rest is of the bead rubber having a complex elastic modulus of from 8 to 20 Mpa, and the minimum thickness of the bead rubber is in a range of about 0.2 to 2.0 mm. If the minimum thickness is more than 2.0 mm, it becomes difficult to firmly pinch the carcass cords.

FIG. 4 shows an example in which the anchor rubber 13 is a single layer.

FIG. 5 shows an example in which the anchor rubber 13 is double-layered. In this example, the anchor rubber 13 is made up of a radially outer layer 13a and a radially inner layer 13b. The complex elastic modulus of the radially inner layer 13b is smaller than the complex elastic modulus of the radially outer layer 13a. The inner layer 13b is arranged so as to contact with the topping rubber tg and substantially isolates (in this example completely isolates) the outer layer 13a from the topping rubber tg of the carcass cords 6C. To reduce the stress at the interface between the radially inner layer 13b and outer layer 13a, the difference in the complex elastic modulus therebetween is set in a range of 5 to 10 MPa.

To achieve the purpose, the anchor rubber 13 must be disposed in the space formed between the bead core 5 and the curved base part 10 of the carcass ply winded portion 6b. And it is desirable that the anchor rubber 13 fills up the space. To be exact, in this embodiment, as the bead core 5 includes the wrapping material 12 and the carcass ply includes the topping rubber tg, the space is formed between the wrapping material 12 and carcass topping rubber tg in actuality.

Considering the region (A) between the radially inner face SL of the bead core 5 (excluding the wrapping material 12) and the curved base part 10 of the carcass ply winded portion 6b (excluding the topping rubber tg) (see FIG. 3), there are at least the anchor rubber 13, the wrapping material 12 and the topping rubber tg. If the percentage in the volume or cross sectional area of the anchor rubber 13 to the total is too small, it is difficult or impossible to secure the carcass cords. If the percentage is too large however, bead unseating is liable to occur. Further, there is a possibility that the anchor rubber 13 pushes back the topping rubber tg and directly contacts with the steel cords. Incidentally, if the percentage is varied, the curvature and size of the base part 10 may be varied.

It is therefore, preferable that the anchor rubber 13 is provided in a range of not more than 95%, more preferably less than 90%, but not more than 20%, more preferably more than 30%, still more preferably more than 40% with respect to either the volume or the cross sectional area in the tire meridian section.

Comparison Tests

Heavy duty radial tires of size 11R22.5 (rim size 7.50.times.22.5) were made and the following remount test and bead durability tests were carried out.

The test tires had the same tire structure shown in FIG. 1 except for the bead structure. But, all the bead structures include the bead core 5 with the wrapping material 12 and the steel cord layer 9 (inner and outer portions radial heights were 27 mm). The specifications thereof are given in Table 1.

Remount Test (Inflation Test):

The test tire mounted on a rim and inflated to 700 kPa was kept at a temperature of 80 degrees C. for 72 hours and the rim was removed. Then, a skilled worker again mounted the tire on the rim and pumped up so as to seat the bead portion in place, and the skilled worker checked whether the tire was easily inflated (in other words whether the air leak was less). Further, the remounted tire was inflated to 700 kPa and the axial distance between the bead toes was measured using an x-ray CT scanner. The larger the axial distance, the larger the engaging force between the bead and rim.

The test results are shown in Table 1 by an index based on Ref. 1 being 100.

Cold Bead Durability Test:

Using a tire drum tester, the test tire was continuously run under the following accelerated test conditions until any bead damage occurred and the total running distance was measured.

Tire load: 300% of normal load of 27.25 kN,

Tire pressure: 700 kPa

Running speed: 20 km/hr

Hot Bead Durability Test:

The wheel rim was heated up to 130 degrees c and then the same test as above was carried out.

The results are indicate in Table 1 by an index based on Ref. 1 being 100. The larger the value, the better the durability.

TABLE 1

Figure 7:
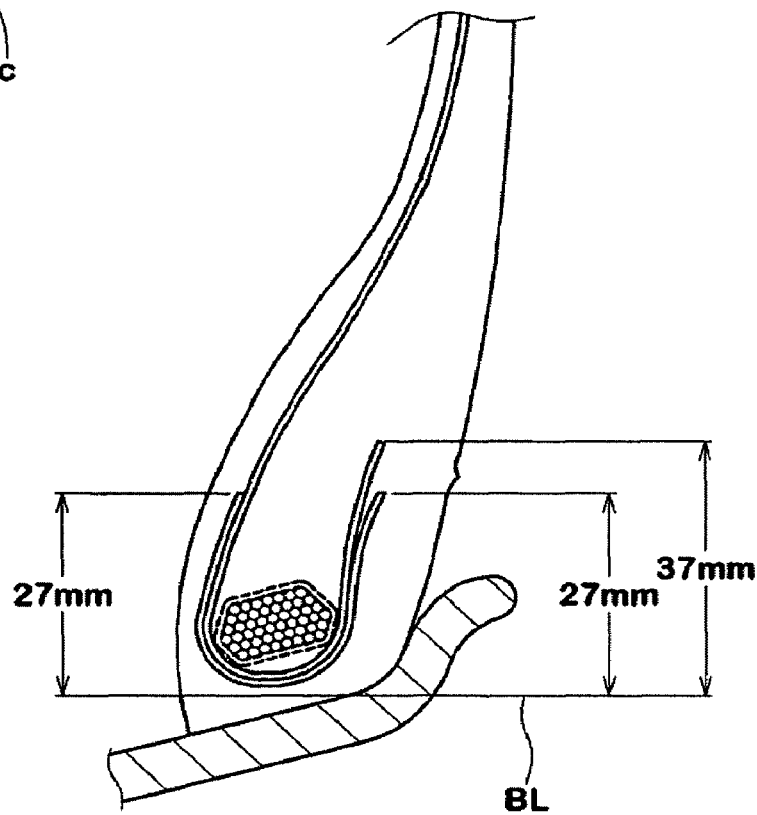
FIG. 7 is a schematic cross sectional view showing a conventional bead structure used in the undermentioned comparison tests.

| | Tire | | | | | |
|---|---|---|---|---|---|---|
| Bead structure | Ref. 1 FIG. 7 | Ref. 2 FIG. 4 | Ref. 3 FIG. 4 | Ref. 4 FIG. 4 | Ex. 1 FIG. 4 | Ex. 2 FIG. 4 |
| Bead core | | | | | | |
| Aspect ratio(Hc/Wc) | 0.6 | 0.45 | 0.45 | 0.45 | 0.45 | 0.45 |
| Total number *1 | 51 | 49 | 49 | 49 | 49 | 49 |
| Number in layer *2 | 8 × 9 × 10 × 9 × 8 × 7 | 9 × 10 × 11 × 10 × 9 | 9 × 10 × 11 × 10 × 9 | 9 × 10 × 11 × 10 × 9 | 9 × 10 × 11 × 10 × 9 | 9 × 10 × 11 × 10 × 9 |
| Anchor rubber *3 | none | none | single | single | single | single |
| Modulus (MPa) | 8 | 8 | 15 | 18 | 22 | 30 |
| Percentage *4 | — | — | 80 | 80 | 80 | 80 |
| Test Results | | | | | | |
| Remount(inflation) | good | wrong | wrong | wrong | good | good |
| Toe-toe distance | 100 | 90 | 95 | 98 | 100 | 103 |
| Bead core shape *5 | N | Y | Y | Y | N | N |
| Bead durability | | | | | | |
| Cold | 100 | 130 | 130 | 130 | 130 | 130 |
| Hot | 100 | 110 | 110 | 110 | 110 | 110 |

| | Tire | | | | | |
|---|---|---|---|---|---|---|
| Bead structure | Ex. 3 FIG. 4 | Ex. 4 FIG. 4 | Ex. 5 FIG. 4 | Ex. 6 FIG. 4 | Ex. 7 FIG. 4 | Ex. 8 FIG. 5 |
| Bead core | | | | | | |
| Aspect ratio(Hc/Wc) | 0.45 | 0.45 | 0.45 | 0.45 | 0.45 | 0.45 |
| Total number *1 | 49 | 49 | 49 | 49 | 49 | 49 |
| Number in layer *2 | 9 × 10 × 11 × 10 × 9 | 9 × 10 × 11 × 10 × 9 | 9 × 10 × 11 × 10 × 9 | 9 × 10 × 11 × 10 × 9 | 9 × 10 × 11 × 10 × 9 | 9 × 10 × 11 × 10 × 9 |

TABLE 1-continued

| | | | | | | |
|---|---|---|---|---|---|---|
| Anchor rubber *3 | single | single | single | single | single | double |
| Modulus (MPa) | 55 | 70 | 55 | 55 | 55 | 50(out)40(in) |
| Percentage *4 | 80 | 80 | 20 | 40 | 60 | 60(out)20(in) |
| Test Results | | | | | | |
| Remount(inflation) | good | good | good | good | good | good |
| Toe-toe distance | 108 | 108 | 100 | 103 | 105 | 108 |
| Bead core shape *5 | N | N | N | N | N | N |
| Bead durability | | | | | | |
| Cold | 130 | 130 | 130 | 130 | 130 | 130 |
| Hot | 110 | 110 | 110 | 110 | 110 | 110 |

*1) The total number of windings of a steel wire.
*2) The number of windings in each layer (from the radially inside to outside)
*3) If "none", a rubber having a complex elastic modulus indicated below (flowed-out carcass topping rubber) filled up the space.
*4) The rest was a rubber having a complex elastic modulus of 8 MPa flowed out from the carcass topping rubber.
*5) Y: The cross sectional shape of the bead core was deformed, N: not deformed

The invention claimed is:

1. A heavy duty tire comprising a tread portion, a pair of sidewall portions, a pair of bead portions each with a bead core therein, a carcass ply of steel cords extending between the bead portions, the carcass ply having edges winded around the bead cores from the axially inside to outside of the tire to form a pair of winded portions and a main portion therebetween, wherein the winded portion around each said bead core comprises an axially inwardly extending turnback part above the bead core, and a base part under the bead core, the base part is curved concavely so as to form a space between the base part and the bead core, and an anchor rubber having a complex elastic modulus of from 20 to 80 MPa at a temperature of 70 degrees C. and a frequency of 10 HZ is disposed in said space,
   wherein said complex elastic modulus of the anchor rubber is more than 25 MPa and less than 70 MPa.

2. The heavy duty tire according to claim 1, wherein said steel cords of the carcass ply are rubberized with a topping rubber having a complex elastic modulus smaller than that of the anchor rubber.

3. The heavy duty tire according to claim 1, wherein said anchor rubber has a cross sectional shape being convex toward the base part of the winded portion.

4. The heavy duty tire according to claim 1, wherein the turnback part terminates before the main portion, leaving a gap between the end of the turnback part and the main portion, and the end is positioned at a distance of 3.0 to 8.0 mm from the radially outside of the bead core.

5. The heavy duty tire according to claim 1, wherein the bead core has a cross sectional shape elongated in a direction parallel to the bead bottom to have an aspect ratio of 0.43 to 0.58.

6. A heavy duty tire comprising a tread portion, a pair of sidewall portions, a pair of bead portions each with a bead core therein, a carcass ply of steel cords extending between the bead portions, the carcass ply having edges winded around the bead cores from the axially inside to outside of the tire to form a pair of winded portions and a main portion therebetween, wherein the winded portion around each said bead core comprises an axially inwardly extending turnback part above the bead core, and a base part under the bead core, the base part is curved concavely so as to form a space between the base part and the bead core, and an anchor rubber having a complex elastic modulus of from 20 to 80 MPa at a temperature of 70 degrees C. and a frequency of 10 HZ is disposed in said space,
   wherein said anchor rubber is layered by different complex elastic moduli, wherein a layer having a lower complex elastic modulus is interposed between a layer having a higher complex elastic modulus and the base part of the winded portion.

7. The heavy duty tire according to claim 6, wherein said layer having a higher complex elastic modulus has a cross sectional shape being convex toward the base part of the winded portion.

* * * * *